United States Patent
Nabeta et al.

(10) Patent No.: US 8,247,516 B2
(45) Date of Patent: Aug. 21, 2012

(54) ROOM-TEMPERATURE CURABLE ORGANOPOLYSILOXANE COMPOSITION

(75) Inventors: Akiko Nabeta, Chiba (JP); Masayuki Onishi, Chiba (JP); Yoshito Ushio, Chiba (JP)

(73) Assignee: Dow Corning Toray Company, Ltd., Chiyoda-ku, Tokyo (JP)

( * ) Notice: Subject to any disclaimer, the term of this patent is extended or adjusted under 35 U.S.C. 154(b) by 82 days.

(21) Appl. No.: 12/739,343

(22) PCT Filed: Oct. 6, 2008

(86) PCT No.: PCT/JP2008/068517
§ 371 (c)(1),
(2), (4) Date: Apr. 22, 2010

(87) PCT Pub. No.: WO2009/054279
PCT Pub. Date: Apr. 30, 2009

(65) Prior Publication Data
US 2010/0236450 A1    Sep. 23, 2010

(30) Foreign Application Priority Data
Oct. 25, 2007    (JP) ................. 2007-278105

(51) Int. Cl.
*C08L 83/04*    (2006.01)
(52) U.S. Cl. .............. 528/34; 528/17; 528/43; 524/588; 525/477
(58) Field of Classification Search ...... 528/10
See application file for complete search history.

(56) References Cited

U.S. PATENT DOCUMENTS
7,307,134 B2 * 12/2007 Lim et al. .................. 528/34

FOREIGN PATENT DOCUMENTS
| | | |
|---|---|---|
| JP | 04-293962 A | 10/1992 |
| JP | 2005-082734 A | 3/2005 |
| JP | 2006-022277 A | 1/2006 |
| WO | WO 2006-006371 A2 | 1/2006 |
| WO | WO 2006006371 A2 * | 1/2006 |

OTHER PUBLICATIONS

English language abstract for JP 04-293962 extracted from espacenet.com database, dated Jul. 16, 2010, 9 pages.
English language translation and abstract for JP 2005-082734 extracted from PAJ database, dated Jul. 16, 2010, 29 pages.
English language translation and abstract for JP 2006-022277 extracted from PAJ database, dated Jul. 16, 2010, 47 pages.
PCT International Search Report for PCT/JP2008/068517, dated Feb. 11, 2009, 3 pages.

* cited by examiner

*Primary Examiner* — Marc Zimmer
(74) *Attorney, Agent, or Firm* — Howard & Howard Attorneys PLLC

(57) ABSTRACT

A room-temperature curable organopolysiloxane composition comprising: (A) a diorganopolysiloxane capped at both molecular terminals with trialkoxysilyl groups and having viscosity of 100 to 1,000,000 mPas at 25° C.; (B) a diorganodimethoxysilane or a partially hydrolyzed product thereof; (C) a diorganodialkoxysilane having silicon-bonded alkoxy group with two or more carbon atoms or a partially hydrolyzed product thereof; and (D) a titanium chelate catalyst, exhibits excellent storage stability and easiness of controlling curing speed as well as by strong adhesion to a substrate with which this composition is in contact during curing along with the possibility of interfacial peeling of the cured product from the aforementioned substrate.

11 Claims, No Drawings

ROOM-TEMPERATURE CURABLE ORGANOPOLYSILOXANE COMPOSITION

RELATED APPLICATIONS

This application claims priority to and all the advantages of International Patent Application No. PCT/JP2008/068517, filed on Oct. 6, 2008, which claims priority to Japanese Patent Application No. JP2007-278105, filed on Oct. 25, 2007.

TECHNICAL FIELD

The present invention relates to a room-temperature curable organopolysiloxane composition and, more particularly, to a room-temperature curable organopolysiloxane composition that is curable by means of a dealcoholization and condensation in contact with moisture in air.

BACKGROUND ART

Room-temperature curable organopolysiloxane compositions curable by means of a dealcoholization and condensation in contact with moisture in air exhibit strong adhesion to substrates with which these compositions are in contact during curing. Therefore, such compositions find application as sealing and coating agents for electric circuits and electrodes for which heating is undesirable. However, if during repair or recycling of electric or electronic devices it is necessary to separate a cured product of the composition from the respective electric circuit or electrode, such cured product cannot be easily completely released.

Japanese Unexamined Patent Application Publication (hereinafter referred to as "Kokai") H04-293962 discloses a room-temperature curable organopolysiloxane composition comprising a diorganopolysiloxane capped at both molecular terminals with trialkoxysilyl groups, a diorganodialkoxysilane, and a titanium chelate catalyst. Furthermore, Kokai 2005-82734 and Kokai 2006-22277 disclose room-temperature curable organopolysiloxane compositions comprising a diorganopolysiloxane capped at both molecular terminals with trialkoxysilyl groups, a non-cross-linkable diorganopolysiloxane, a diorganodialkoxysilane, and a titanium chelate catalyst. These compositions adhere to substrates with sufficient strength and can form cured products suitable for interfacial peeling from the substrate. Therefore, such compositions can be used as sealing agents and coating agents in electric circuits or electrodes of electrical and electronic devices suitable for repair or recycling.

Recently, however, demands occurred with regard to sealing and coating of electric circuits and electrodes for a room-temperature curable organopolysiloxane composition capable of performing the sealing and coating processes with the most optimal speed of curing. It is required, however, that along with adjustment of the curing speed the last-mentioned compositions preserve storage stability.

It is an object of the invention to provide a room-temperature curable organopolysiloxane composition which is characterized by excellent storage stability and ease of controlling curing speed as well as by strong adhesion to a substrate with which this composition is in contact during curing along with possibility of interfacial peeling from the aforementioned substrate.

DISCLOSURE OF INVENTION

The room-temperature curable organopolysiloxane composition of the present invention comprises:

(A) 100 parts by mass of a diorganopolysiloxane capped at both molecular terminals with trialkoxysilyl groups and having viscosity of 100 to 1,000,000 mPa·s at 25° C.;

(B) 0.1 to 20 parts by mass of a diorganodimethoxysilane of the general formula given below or a partially hydrolyzed product thereof:

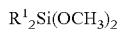

$R^1{}_2Si(OCH_3)_2$ (where $R^1$s are the same or different, and designate substituted or unsubstituted monovalent hydrocarbon groups);

(C) 0.1 to 20 parts by mass of a diorganodialkoxysilane of the general formula given below or a partially hydrolyzed product thereof:

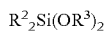

$R^2{}_2Si(OR^3)_2$ (where $R^2$s are the same or different, and designate substituted or unsubstituted monovalent hydrocarbon groups, and $R^3$s designate the same or different alkyl groups with two or more carbon atoms); and (D) 0.1 to 10 parts by mass of a titanium chelate catalyst.

EFFECTS OF INVENTION

The room-temperature curable organopolysiloxane composition of the invention is efficient in that it allows easy control of the curing speed, sufficiently strong adhesion to a substrate with which this composition is in contact during curing, and possibility of interfacial peeling from the substrate after curing.

DETAILED DESCRIPTION OF THE INVENTION

The room-temperature curable organopolysiloxane composition of the invention will now be described in more details.

Component (A), which is a diorganopolysiloxane capped at both molecular terminals with trialkoxysilyl groups, is the main component of the composition. The trialkoxysilyl groups of component (A) can be represented, e.g., by trimethoxysilyl, triethoxysilyl, dimethoxyethoxysilyl, methoxydiethoxysilyl, or triisopropoxysilyl groups. Silicon-bonded groups of component (A) other than the trialkoxysilyl groups may be exemplified by methyl, ethyl, propyl, butyl, pentyl, hexyl, octyl, decyl, octadecyl, or similar alkyl groups; cyclopentyl, cyclohexyl, or similar cycloalkyl groups; vinyl, allyl, butenyl, pentenyl, hexenyl, or similar alkenyl groups; phenyl, tolyl, xylyl, naphthyl, or similar aryl groups; benzyl, phenethyl, or similar aralkyl groups; or other univalent hydrocarbon groups; as well as chloromethyl, 3-chloropropyl, 3,3,3-trifluoropropyl, or similar halogen-substituted univalent hydrocarbon groups. Most preferable in view of commercial availability of the aforementioned component are methyl and phenyl groups. Component (A) has essentially a linear molecular structure, through it can be partially branched as well. Component (A) should have viscosity of 100 to 1,000,000 mPa·s, preferably viscosity of 100 to 100,000 mPa·s at 25° C. If the viscosity is below the recommended lower limit, this will impair mechanical strength of the obtained cured product. If, on the other hand, the viscosity exceeds the recommended upper limit, this will impair handleability and workability of the obtained composition and will hinder the use of the composition as a sealing or potting agent.

It is recommended that component (A) is a diorganopolysiloxane represented by the following general formula:

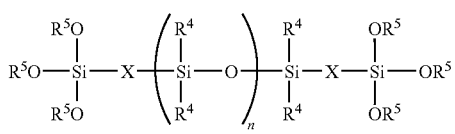

In the above formula, $R^4$s are the same or different, and designates substituted or unsubstituted monovalent hydrocarbon groups that can be exemplified by the examples of substituted or unsubstituted univalent hydrocarbon groups as those mentioned above. Preferably, $R^4$s are methyl or phenyl groups. In the above formula, $R^5$s designates the same or different alkyl groups, such as methyl, ethyl, propyl, butyl, or pentyl groups, of which preferable are methyl and ethyl groups. Furthermore, in the above formula X's may be the same or different, and designate oxygen atoms or alkylene groups. The alkylene groups designated by X are exemplified by ethylene, propylene, butylene, pentylene, or similar alkylene groups having 2 to 6 carbon atoms. In the above formula, "n" is an integer that provides a viscosity of the organopolysiloxane at 25° C. within the range of 100 to 1,000,000 mPa·s, preferably, 100 to 100,000 mPa·s.

Component (B), which is a cross-linking agent of the composition, comprises a diorganodimethoxysilane of the general formula given below or a partially hydrolyzed product thereof:

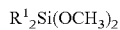

In the above formula, $R^1$s are the same or different, and designate substituted or unsubstituted monovalent hydrocarbon groups that can be exemplified by the examples of substituted or unsubstituted univalent hydrocarbon groups as those mentioned above. From the viewpoint of commercial availability, most preferable is the aforementioned diorganodimethoxysilane that contains methyl groups. Such a diorganodimethoxysilane of component (B) can be exemplified by a dimethyldimethoxysilane, methylethyldimethoxysilane, methylpropyldimethoxysilane, methylvinyldimethoxysilane, diethyldimethoxysilane, divinyldimethoxysilane, phenylmethyldimethoxysilane, diphenyldimethoxysilane, or mixtures of two or more of the aforementioned compounds.

Component (B) is used in an amount of 0.1 to 20 parts by mass, preferably 0.1 to 15 parts by mass per 100 parts by mass of component (A). If component (B) is used in an amount less than the recommended lower limit, the composition will not be cured to a sufficient degree and will remain a one-part composition of low storage stability. If, on the other hand, the content of component (B) exceeds the recommended upper limit, this will either delay curing of the obtained composition, or will impair mechanical properties of a cured product of the composition.

Component (C), similar to component (B), is a cross-linking agent of the composition. Component (C) is a diorganodialkoxysilane of the general formula given below or a partially hydrolyzed product thereof:

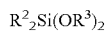

In the above formula, $R^2$s are the same or different, and designate substituted or unsubstituted monovalent hydrocarbon groups that can be exemplified by the examples of substituted or unsubstituted univalent hydrocarbon groups as those mentioned above, most preferable of which are methyl and phenyl groups. In the above formula, $R^3$s designate the same or different alkyl groups with two or more carbon atoms. Specific examples include ethyl, propyl, butyl, pentyl, hexyl, or similar alkyl groups with 2 to 6 carbon atoms. Most preferable are ethyl and propyl groups. The diorganodialkoxysilanes of aforementioned component (C) can be exemplified by dimethyldiethoxysilane, methylethyldiethoxysilane, methylpropyldiethoxysilane, methylvinyldiethoxysilane, diethyldiethoxysilane, divinyldiethoxysilane, phenylmethyldiethoxysilane, diphenyldiethoxysilane, or a mixture of two or more of the aforementioned compounds.

Component (C) is used in an amount of 0.1 to 20 parts by mass, preferably 0.1 to 15 parts by mass per 100 parts by mass of component (A). If component (C) is used in an amount less than the recommended lower limit, the composition will not be cured to a sufficient degree and will remain a one-part composition of low storage stability. If, on the other hand, the content of component (B) exceeds the recommended upper limit, this will either delay curing of the obtained composition, or will impair mechanical properties of a cured product of the composition.

There are no special restrictions with regard to the ratio, in which components (B) and (C) can be used in the composition of the invention, but in order to provide storage stability of the composition and facilitate adjustment of the curing speed, it is recommended that the ratio of component (B) to component (C) (amount of component (B): amount of component (C)) is in the range of (1:20) to (5:1), preferably in the range of (1:10) to (2:1). If the content of component (B) exceeds the recommended upper limit, it will be difficult to adjust the curing speed of the obtained composition. If, on the other hand, the content of component (B) is below the recommended lower limit, the obtained composition will have low storage stability, and the curing speed will vary with storage time.

Component (D) is a titanium chelate catalyst used to accelerate curing of the composition. This component can be exemplified by a dimethoxy bis(methylacetoacetate) titanium, diisopropoxy bis(acetylacetonate) titanium, diisopropoxy bis(ethylacetoacetate) titanium, diisopropoxy bis(methylacetoacetate) titanium, or a dibutoxy bis (ethylacetoacetate) titanium.

Component (D) is used in an amount of 0.1 to 10 parts by mass, preferably 0.3 to 6 parts by mass per 100 parts by mass of component (A). If component (D) is used in an amount less than the recommended lower limit, acceleration of composition curing will be insufficient. If, on the other hand, component (D) is used in an amount exceeding the recommended upper limit, this will impair storage stability of the composition.

In order to improve flowability of the composition and mechanical properties of the cured product, the composition may incorporate (E) a finely powdered silica. This component can be represented by fumed silica, fused silica, precipitated silica, crystalline silica, or finely powdered silica surface treated with a silane compound, silazane compound, or a low-molecular-weight siloxane compound. Most preferable are fine silica powders having BET specific surface area at least 50 m²/g, or fine silica powders surface treated with silane compounds, silazane compounds, or low-molecular-weight siloxane compounds. There are no special restrictions with regard to amounts in which component (E) can be added to the composition but it can be recommended to add this component in an amount of 1 to 30 parts by mass per 100 parts by mass of component (A).

In order to provide good adhesion of a cured product of the composition to a substrate and to form such a cured product which can be interfacially peeled from the substrate even a long time after curing, the composition may incorporate (F) an organopolysiloxane which is capped at parts of molecular terminals with trialkoxysilyl groups and is capped at the other molecular terminals with triorganosilyl groups, an organopolysiloxane which is free of silicon-bonded alkoxy group in a molecular, or a mixture of the aforementioned organopolysiloxanes. The silicon-bonded groups of these organopolysiloxanes can be exemplified by the examples of substituted or unsubstituted univalent hydrocarbon groups as those mentioned above. From the point of view of commercial availability, preferable are compounds having methyl and phenyl groups. Also, there are no special restrictions with regard to viscosity of component (F) at 25° C. It may be recommended, however, that viscosity of component (F) is in the range of 10 to 1,000,000 mPa·s, preferably in the range of 50 to 100,000 mPa·s. If viscosity of component (F) is below the recommended lower limit, this may cause bleeding of this component to the surface of a cured product, and if the viscosity exceeds the recommended upper limit, this will impair handleability and workability of the composition or will make difficult to use this component as a potting or sealing agent of the composition. There are no special restrictions with regard to amounts in which component (F) can be added to the composition but it may be recommended to add this component in an amount of 0.1 to 50 parts by mass per 100 parts by mass of Component (A).

Within the limits which are not in contradiction with the object of the invention, the composition may incorporate various fillers such as calcium carbonate, titanium dioxide, diatomaceous earth, alumina, magnesia, zinc oxide, colloidal calcium carbonate, carbon black, or a similar filler; the aforementioned fillers surface treated with a silane compound, silazane compound, or a low-molecular-weight siloxane compound; as well as organic solvents, anti-corrosive agents, flame retarding agents, heat-resistant agents, plasticizers, agents imparting thixotropic properties, pigments, or the like.

There are no restrictions with regard to methods used for the preparation of the composition. For example, components (A) through (D), and if necessary, other components, can be mixed altogether simultaneously, but if the composition is stored as a one-part composition, mixing with component (D) and storage after mixing have to be carried out under conditions isolated from humidity. If the composition is stored as a two-part composition, components (A) and (D) must be stored separately.

Since the composition of the invention is cured in contact with moisture in air and after curing provides a sufficiently strong bond with the substrate with which the composition is in contact during curing, and since the cured product can be interfacially separated from the substrate even long time after curing, such a composition is suitable for use as a sealant or a coating agent for electric circuits and electrodes for which heating is undesirable or which have to be protected from humid air or contamination.

EXAMPLES

The room-temperature curable organopolysiloxane composition of the invention will be further described in more details by way of practical and comparative examples. The values of viscosity were measured at 25° C. The speed of curing of the room-temperature curable organopolysiloxane compositions was measured by the following method.
[Speed of Curing]

The room-temperature curable organopolysiloxane composition was applied onto a glass plate in the form of a 2 mm-thick layer, and while the layer was kept intact at 25° C. and 50% RH, a finger was brought into light contact with this layer, and the tack-free-time [TFT] was measured.

Practical Example 1

A mixture was prepared by mixing the following components for 30 min. at room temperature under a reduced pressure of 40 mmHg: 100 parts by mass of a dimethylpolysiloxane having a viscosity of 2,000 mPa·s, capped at both molecular terminals with trimethoxysiloxy groups, and represented by the following formula:

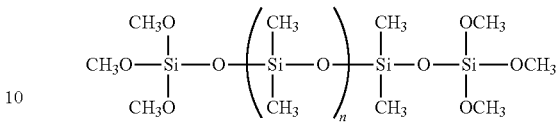

(where "n" is an integer at which viscosity of the aforementioned dimethylpolysiloxane becomes equal to 2,000 mPa·s); and 6 parts by mass of a fumed silica which is surface treated with a hexamethyldisilazane and has BET specific surface areas of 110 m$^2$/g. The obtained mixture was then combined and uniformly mixed under moisture-free conditions with 2 parts by mass of a dimethyldimethoxysilane, 2 parts by mass of a dimethyldiethoxysilane, and 2 parts by mass of a diisopropoxy bis(ethylacetoacetate) titanium. As a result, a room-temperature curable organopolysiloxane composition was prepared.

The aforementioned TFT test of the composition showed a TFT of 10 min. Furthermore, after application of a 1 mm-thick layer of the composition onto a glass plate, the composition was cured by retaining the coated plate for 7 days under conditions of 25° C. and 50% RH. The cured product comprised a rubber-like body. In spite of the fact that the cured product firmly adhered to the surface of the glass plate, it could be interfacially peeled from the plate. The composition was subjected to TFT test also after one-month storage under moisture-isolated condition at 25° C., and the test showed a value of 10 min.

Practical Example 2

100 parts by mass of the dimethylpolysiloxane, which was capped at both molecular terminals with trimethoxysiloxy groups, had a viscosity of 2,000 mPa·s, was used in Practical Example 1 was mixed at room temperature for 30 min. under a reduced pressure of 40 mmHg with 6 parts by mass of a fumed silica having BET specific surface area of 110 m$^2$/g and surface treated with a hexamethyldisilazane. The obtained mixture was combined with 1 part by mass of a dimethyldimethoxysilane, 7 parts by mass of a dimethyldiethoxysilane, and 2 parts by mass of a diisopropoxy bis(ethylacetoacetate) titanium. The components were mixed to uniformity under moisture-isolated conditions to produce a room-temperature curable organopolysiloxane composition.

The TFT test of the obtained composition showed a value of 20 min. After application of a 1 mm-thick layer of the composition onto a glass plate, the composition was cured by retaining the coated plate for 7 days under conditions of 25° C. and 50% RH. The cured product comprised a rubber-like body. In spite of the fact that the cured product firmly adhered to the surface of the glass plate, it could be interfacially peeled from the plate. The composition was subjected to TFT test also after one-month storage under moisture-isolated condition at 25° C., and the test showed a value of 21 min.

Practical Example 3

100 parts by mass of the dimethylpolysiloxane, which was capped at both molecular terminals with trimethoxysiloxy groups, had a viscosity of 2,000 mPa·s, and was used in Practical Example 1 was mixed at room temperature for 30 min. under a reduced pressure of 40 mmHg with 6 parts by mass of a fumed silica having BET specific surface area of 110 m²/g and surface treated with a hexamethyldisilazane. The obtained mixture was combined with 1 part by mass of a dimethyldimethoxysilane, 7 parts by mass of a dimethyldiethoxysilane, 3 parts by mass of a copolymer of a methylphenylsiloxane and a dimethylsiloxane capped at both molecular terminals with trimethylsiloxy groups and having a viscosity of 100 mPa·s, and 2 parts by mass of a diisopropoxy bis(ethylacetoacetate) titanium. The components were mixed to uniformity under moisture-isolated conditions to produce a room-temperature curable organopolysiloxane composition.

The TFT test of the obtained composition showed a value of 20 min. After application of a 1 mm-thick layer of the composition onto a glass plate, the composition was cured by retaining the coated plate for 7 days under conditions of 25° C. and 50% RH. The cured product comprised a rubber-like body. In spite of the fact that the cured product firmly adhered to the surface of the glass plate, it could be interfacially peeled from the plate. The composition was subjected to TFT test also after one-month storage under moisture-isolated condition at 25° C., and the test showed a value of 21 min.

Comparative Example 1

100 parts by mass of the dimethylpolysiloxane, which was capped at both molecular terminals with trimethoxysiloxy groups, had a viscosity of 2,000 mPa·s, and was used in Practical Example 1 was mixed at room temperature for 30 min. under a reduced pressure of 40 mmHg with 6 parts by mass of a fumed silica having BET specific surface area of 110 m²/g and surface treated with a hexamethyldisilazane. The obtained mixture was combined with 2 parts by mass of a dimethyldimethoxysilane and 2 parts by mass of a diisopropoxy bis(ethylacetoacetate) titanium. The components were mixed to uniformity under moisture-isolated conditions to produce a room-temperature curable organopolysiloxane composition.

The TFT test of the obtained composition showed a value of 3 min. After application of a 1 mm-thick layer of the composition onto a glass plate, the composition was cured by retaining the coated plate for 7 days under conditions of 25° C. and 50% RH. The cured product comprised a rubber-like body. In spite of the fact that the cured product firmly adhered to the surface of the glass plate, it could be interfacially peeled from the plate. The composition was subjected to TFT test also after one-month storage under moisture-isolated condition at 25° C., and the test showed a value of 4 min.

Comparative Example 2

100 parts by mass of the dimethylpolysiloxane, which was capped at both molecular terminals with trimethoxysiloxy groups, had a viscosity of 2,000 mPa·s, and was used in Practical Example 1 was mixed at room temperature for 30 min. under a reduced pressure of 40 mmHg with 6 parts by mass of a fumed silica having BET specific surface area of 110 m²/g and surface treated with a hexamethyldisilazane. The obtained mixture was combined with 8 parts by mass of a dimethyldimethoxysilane, and 2 parts by mass of a diisopropoxy bis(ethylacetoacetate) titanium. The components were mixed to uniformity under moisture-isolated conditions to produce a room-temperature curable organopolysiloxane composition.

The TFT test of the obtained composition showed a value of 3 min. After application of a 1 mm-thick layer of the composition onto a glass plate, the composition was cured by retaining the coated plate for 7 days under conditions of 25° C. and 50% RH. The cured product comprised a rubber-like body. In spite of the fact that the cured product firmly adhered to the surface of the glass plate, it could be interfacially peeled from the plate. The composition was subjected to TFT test also after one-month storage under moisture-isolated condition at 25° C., and the test showed a value of 4 min.

Comparative Example 3

100 parts by mass of the dimethylpolysiloxane, which was capped at both molecular terminals with trimethoxysiloxy groups, had a viscosity of 2,000 mPa·s, and was used in Practical Example 1 was mixed at room temperature for 30 min. under a reduced pressure of 40 mmHg with 6 parts by mass of a fumed silica having BET specific surface area of 110 m²/g and surface treated with a hexamethyldisilazane. The obtained mixture was combined with 6 parts by mass of a dimethyldiethoxysilane, and 2 parts by mass of a diisopropoxy bis(ethylacetoacetate) titanium. The components were mixed to uniformity under moisture-isolated conditions to produce a room-temperature curable organopolysiloxane composition.

The TFT test of the obtained composition showed a value of 17 min. After application of a 1 mm-thick layer of the composition onto a glass plate, the composition was cured by retaining the coated plate for 7 days under conditions of 25° C. and 50% RH. The cured product comprised a rubber-like body. In spite of the fact that the cured product firmly adhered to the surface of the glass plate, it could be interfacially peeled from the plate. The composition was subjected to TFT test also after one-month storage under moisture-isolated condition at 25° C., and the test showed a value of 31 min which was a significant change.

INDUSTRIAL APPLICABILITY

Since the room-temperature curable organopolysiloxane of the present invention allows control of the curing speed, provides sufficiently tight adhesion to a substrate in the course of curing, and can be interfacially peeled from the substrate, this composition can be used as a sealing and coating agent for electric circuits of electrodes which have to be protected from humid air or contamination. Furthermore, the room-temperature curable organopolysiloxane of the present invention also can be used as a coating or as a temporal tacking agent for fibrous parts, glass products, metal products, plastic products, or the like.

The invention claimed is:
1. A room-temperature curable organopolysiloxane composition comprising:
 (A) 100 parts by mass of a diorganopolysiloxane capped at both molecular terminals with trialkoxysilyl groups and having viscosity of 100 to 1,000,000 mPa·s at 25° C.;
 (B) 0.1 to 20 parts by mass of a diorganodimethoxysilane of the general formula given below or a partially hydrolyzed product thereof:

$R^1{}_2Si(OCH_3)_2$ where $R^1$s are the same or different, and designate substituted or unsubstituted monovalent hydrocarbon groups;
 (C) 0.1 to 20 parts by mass of a diorganodialkoxysilane of the general formula given below or a partially hydrolyzed product thereof:

$R^2{}_2Si(OR^3)_2$ where $R^2$s are the same or different, and designate substituted or unsubstituted monovalent hydrocarbon groups, and $R^3$s designate the same or different alkyl groups with two or more carbon atoms; and (D) 0.1 to 10 parts by mass of a titanium chelate catalyst, wherein the quantitative ratio of component (B) to component (C) ranges from 1:20 to 5:1.

2. The room-temperature curable organopolysiloxane composition according to claim 1, wherein component (A) is a diorganopolysiloxane represented by the following general formula:

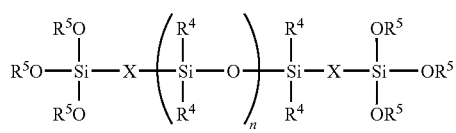

where $R^4$s are the same or different, and designate substituted or unsubstituted monovalent hydrocarbon groups; $R^5$ designates the same or different alkyl groups; X's may be the same or different, and designate oxygen atoms or alkylene groups; and "n" is an integer that provides a viscosity of said organopolysiloxane at 25° C. within the range of 100 to 1,000,000 mPa·s.

3. The room-temperature curable organopolysiloxane composition according to claim 1, wherein $R^3$s in the formula of component (C) designate ethyl groups or propyl groups.

4. The room-temperature curable organopolysiloxane composition according to claim 1, further comprising (E) a silica powder in an amount of 1 to 40 parts by mass per 100 parts by mass of component (A).

5. The room-temperature curable organopolysiloxane composition according to claim 1, further comprising (F) an organopolysiloxane which is capped at parts of molecular terminals with trialkoxysilyl groups and is capped at the other molecular terminals with triorganosilyl groups, and/or an organopolysiloxane which is free of silicon-bonded alkoxy group in a molecular, said component (F) being used in an amount of 0.1 to 50 parts by mass per 100 parts by mass of component (A).

6. The room-temperature curable organopolysiloxane composition according to claim 1, wherein the quantitative ratio of component (B) to component (C) ranges from 1:10 to 2:1.

7. The room-temperature curable organopolysiloxane composition according to claim 1 comprising from 0.1 to 15 parts of component (B).

8. The room-temperature curable organopolysiloxane composition according to claim 7 comprising from 0.1 to 15 parts of component (C).

9. The room-temperature curable organopolysiloxane composition according to claim 1 comprising from 0.1 to 15 parts of component (C).

10. The room-temperature curable organopolysiloxane composition according to claim 1, wherein $R^2$s in the formula of component (C) designate phenyl groups or methyl groups.

11. The room-temperature curable organopolysiloxane composition according to claim 1, wherein component (C) is selected from the group that includes dimethyldiethoxysilane, methylethyldiethoxysilane, methylpropyldiethoxysilane, methylvinyldiethoxysilane, diethyldiethoxysilane, divinyldiethoxysilane, phenylmethyldiethoxysilane, diphenyldiethoxysilane, and combinations thereof.

* * * * *